J. P. FISHER.
APPARATUS FOR SEPARATING ENTRAINED LIQUIDS FROM GASES.
APPLICATION FILED JUNE 8, 1916.

1,273,595.

Patented July 23, 1918.
2 SHEETS—SHEET 1.

Witness
H. H. Lybrand

Inventor
James P. Fisher
By S. Jay Teller
Attorney

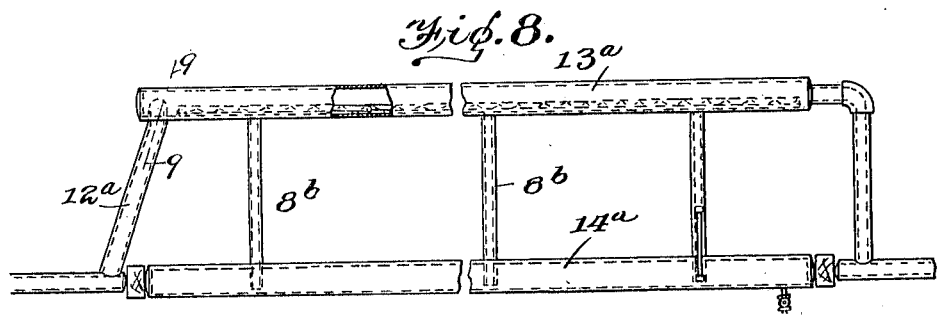
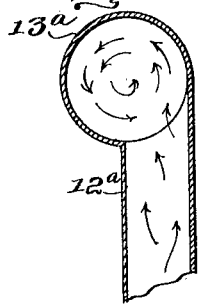
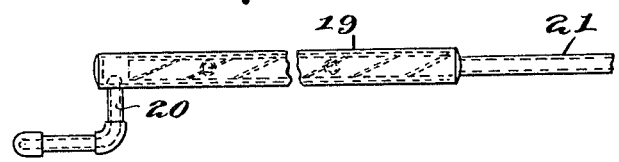
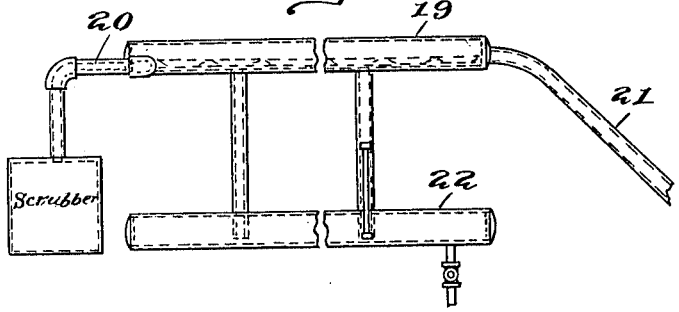
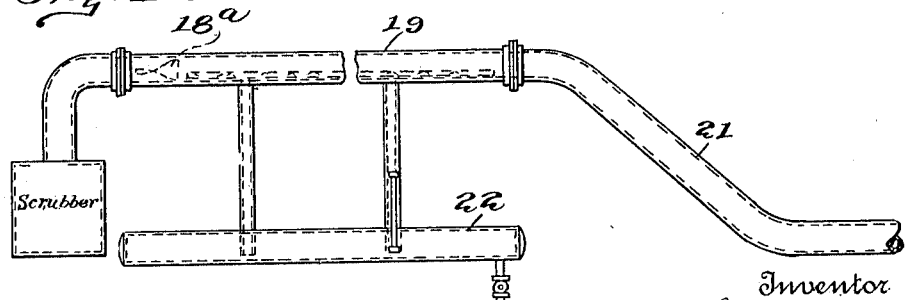

UNITED STATES PATENT OFFICE.

JAMES P. FISHER, OF BARTLESVILLE, OKLAHOMA.

APPARATUS FOR SEPARATING ENTRAINED LIQUIDS FROM GASES.

1,273,595.  Specification of Letters Patent.  Patented July 23, 1918.

Application filed June 8, 1916. Serial No. 102,517.

*To all whom it may concern:*

Be it known that I, JAMES P. FISHER, a citizen of the United States, residing at Bartlesville, in the county of Washington and State of Oklahoma, have invented certain new and useful Improvements in Apparatus for Separating Entrained Liquids from Gases, of which the following is a specification, reference being had therein to the accompanying drawing.

The invention relates especially to devices for removing finely divided oil or water from gas flowing through a pipe or main, thus serving for the protection of the pipe lines against damage due to the fluids, and also serving to prevent other troubles which the fluids frequently cause. While I will herein refer specifically to the separation of liquids from gases it will be understood that by the term gases I mean to include not only fuel gases, but also steam or other gaseous bodies. In fact devices embodying my invention are well adapted to be used in steam pipes to separate the water from the steam.

One of the more specific objects of the invention is to provide a separating device of cheap and simple construction which can be placed directly in the pipe to remove liquid from the gas without materially interfering with the flow of the latter. A further object of the invention is to provide an improved general arrangement of parts whereby the pipe section containing the separating devices can be positioned out of the line of the main pipe. Further objects of the invention will be fully apparent from the following specification and claims:

In the accompanying drawings I have illustrated several embodiments of the invention, but it will be understood that these are shown for illustrative purposes only and are not intended to define or limit the scope of the invention, the appended claims being relied upon for that purpose.

Referring to the drawings—

Fig. 8 shows another construction in which the pipe section containing the separating devices is offset from the main pipe line.

Fig. 9 is a sectional view taken along the line 9—9 of Fig. 8.

Fig. 10 is a side view of an apparatus for separating the liquids from the gases discharged from a scrubber, the scrubber being indicated diagrammatically.

Fig. 11 is a plan view of the apparatus shown in Fig. 10, the scrubber being omitted.

Fig. 12 shows another apparatus somewhat similar to that shown in Fig. 10 for separating the liquids from gases discharged from the scrubber.

Figure 1:
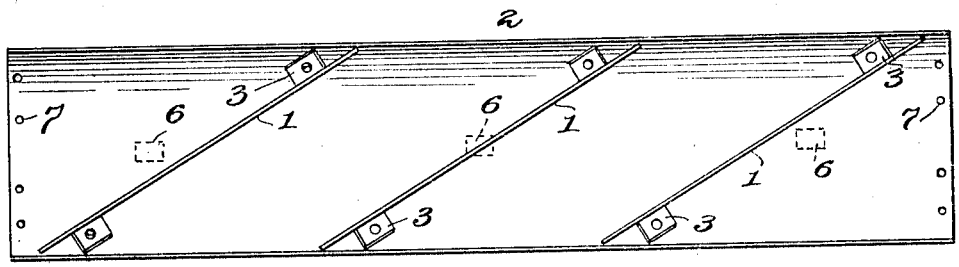
Figure 1 is a plan view of one of the pans which form a part of my improved separating device.
Figure 2:
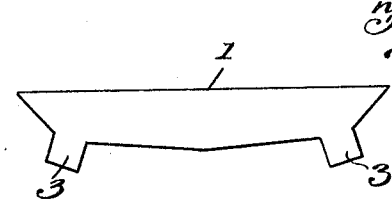
Fig. 2 is a detailed side view of one of the vanes secured to the pan.

Referring to the drawings 1, 1, are a series of vanes arranged parallel to each other and so related that when placed in a pipe they will be located in oblique positions with respect to the longitudinal lines of the pipe. In other words, the vanes are positioned at oblique angles to the longitudinal lines of the pipe and also at oblique angles to the circumference of the pipe. The vanes can be held in position in the pipe in any desired way, but I prefer to provide a connector which serves to hold the vanes in the proper relative positions without there being any direct connection between the vanes and the pipe. Preferably this connector is in the form of a sheet metal pan 2 which is curved to conform approximately to the walls of the pipe. As shown each of the vanes 1 is provided with tabs 3, 3 which are bent over and riveted to the pan, thus holding the vanes in place. The bottom of each vane is cut along straight lines, as indicated in Figs. 2 and 3, thus providing a space between each vane and the pan through which liquid can pass.

Figure 3:
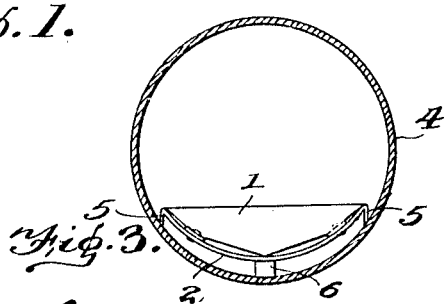
Fig. 3 is an end view of the pan shown in Fig. 1, the pan being shown in position in a pipe.

When in use the pan 2 carrying the vanes 1 is placed in a pipe, such as that indicated at 4 in Fig. 3. The body of the pan is supported above the bottom of the pipe in any suitable way. Preferably the edges of the metal of the pan are bent over at 5, 5 to engage the pipe and near the center of the pan there are provided supporting blocks 6, 6, which also engage the bottom of the pipe. Preferably the pan is provided at each end with holes 7, 7, by means of which the pan can be connected to adjacent pans when a series of them are arranged in a pipe.

Figure 4:
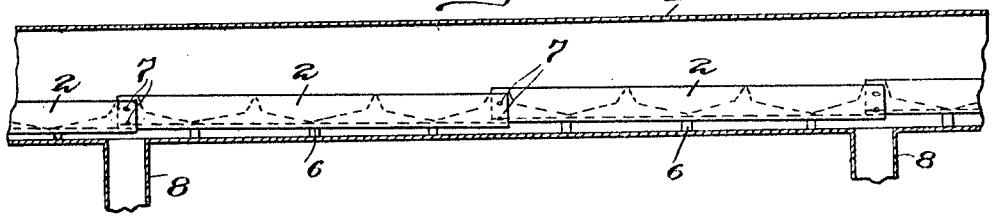
Fig. 4 is a longitudinal sectional view through a pipe line showing several of the pans in place.

In Fig. 4 there is shown a pipe section in which there are positioned several of the pans. Preferably the pans are overlapped, as shown, and connected by means of bolts or rivets through the holes 7, 7, already described. It is to be noted however that the connection between the pans is sufficiently loose to permit the liquid collecting in any one pan to flow out the end thereof and into the bottom of the pipe. At suitable intervals there are provided drainage drops 8, 8, through which liquid can be discharged from the bottom of the pipe.

In operation the gas passing through the pipe engages the vanes 1, 1, which tend to give it a diagonal movement. This diagonal movement of the gas continues around the wall of the pipe until another vane or set of vanes is engaged whereby the movement is accentuated. The result is that after passing a few vanes the gas acquires a very rapid spiral movement which serves to deposit the entrained liquid on the walls of the pipe and on the vanes and on the pan 2. The liquid thus deposited runs by gravity to the bottom of the pipe from which it is discharged through the drops 8. It will be observed that the liquid collected in the bottom of the pipe is protected by the pan from the action of the gases which action if permitted would tend to again pick up the liquid.

Figure 5:
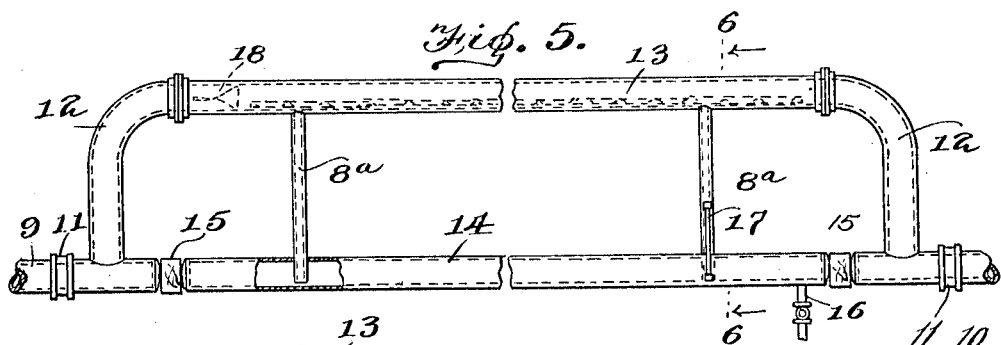
Fig. 5 shows one form of construction in which the pipe section containing the separating devices is offset from the main pipe line.

Fig. 5 shows a practical application of the separating device to a pipe line. 9 and 10 are pipe sections forming parts of the said line, each pipe section being connected to the next adjacent one by suitable couplings such as indicated at 11, 11. Preferably use is made of rubber couplings of ahe Dresser or Hammond type. As shown there is connected to each of the pipes 9 and 10 a combined T and elbow 12. A pipe 13 is suitably coupled to the two elbows being positioned parallel to the main pipe line. The ends of the T's opposite to the pipes 9 and 10 are closed and between these closed ends there is positioned a pipe section 14 which is also closed at its ends. Preferably blocks 15, 15 are forced in between the ends of the pipe 14 and the ends of the T's thus serving to hold all of the pipe sections of the pipe line against separation longitudinally. This construction is particularly desirable when rubber couplings of the types already referred to are used. With the blocks arranged as shown each pipe section is firmly held against the next and there is no possibility of longitudinal movement which would strain and perhaps break the rubber couplings. When threaded or welded connections are used the blocks 15 can be omitted.

Figure 6:
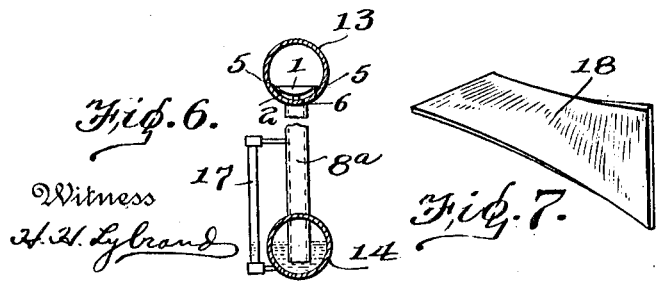
Fig. 6 is a sectional view taken along the line 6—6 of Fig. 5.

In the pipe 13 there are positioned pans with vanes such as already described in connection with Figs. 1 to 4. Drops $8^a$, $8^a$, similar to the drops 8, 8, shown in Fig. 4 extend downward into pipe section 14 which serves as a reservoir for separated liquid. The reservoir 14 is provided with a valved drain pipe 16 through which the liquid can be drawn off when desired. Preferably a gage glass 17 is provided as clearly shown in Fig. 6 for indicating the depth of liquid in the reservoir.

Preferably in order to assist the vanes 1, 1, in causing the gases in the pipe 13 to have a spiral movement I provide supplemental means at the initial end of the pipe for starting such a movement. In the construction shown in Fig. 5 this means consists of a twisted bane or blade 18 placed in the pipe. This blade is shown in perspective in Fig. 7. It will be obvious that as the gas passes this vane it is given an initial spiral movement, which movement is continued and accentuated by the vanes 1, 1.

In Fig. 8 there is shown another construction embodying the invention, this construction being similar in many respects to that shown in Fig. 5. In this case the offset pipe containing the separating pans and vanes is somewhat larger than the pipes of the main line. This pipe is indicated by $13^a$. The closed pipe section which serves as a reservoir is indicated by $14^a$. $8^b$, $8^b$, indicate the drainage drops from the pipe $13^a$ to the pipe $14^a$. In this construction the gas is given an initial spiral movement by means of a tangentially arranged inlet pipe $12^a$ as shown clearly in Fig. 9. The gas being thus admitted tangentially tends to follow around the surface of the larger pipe $13^a$, thus having a spiral movement, which movement is continued and accentuated by the vanes 1.

In Figs. 10 and 11 I have shown a separating apparatus adapted to be used in conjunction with a gas scrubber for separating the liquid from the gas as it leaves the scrubber. The scrubber is indicated diagrammatically in Fig. 10 and can be of any usual or preferred construction, as the scrubber itself constitutes no part of my present invention. 19 is the main separator pipe section in which there are placed pans carrying vanes as already clearly described in connection with Figs. 1 to 4. The gas is led into the pipe 19 through a pipe 20 which joins it tangentially in a manner similar to that illustrated in Fig. 9. From the pipe 19 the gas is discharged through a pipe 21. Positioned below the pipe 19 is a pipe 22 closed at its ends which serves as a reservoir for liquid. Suitable drainage drops extend from the pipe 19 to the pipe 22.

Figure 7:
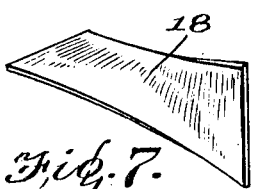
Fig. 7 is a detailed perspective view of the twisted vane shown in dotted lines in Fig. 5.

Fig. 12 shows a construction quite similar to that shown in Figs. 10 and 11, the principal differences being that the gas is given an initial spiral movement by means of a blade 18ª similar in construction to the blade 18, shown in Figs. 5 and 7.

It will be understood that the invention can be embodied in constructions different from those shown, and that various modifications and substitutions of equivalent parts can be made without departing from the spirit of the invention.

What I claim is:

1. In a device for separating liquid from gas passing through a pipe, the combination of a pan curved to approximately conform to the inner surface of the pipe wall, and a series of vanes secured to the concave side of the pan in oblique arrangement whereby gas passing through the said pipe is given a spiral motion when the pan and vanes are placed therein.

2. In a device for separating liquid from gas passing through a pipe, the combination of a pan curved to approximately conform to the inner surface of the pipe wall, and a series of vanes secured to the concave side of the pan with a liquid flow space between each vane and the pan, the said vanes being in oblique arrangement whereby gas passing through the said pipe is given a spiral motion when the pan and vanes are placed therein 3. In a device for separating liquid from gas passing through a pipe, the combination of a pan curved to approximately conform to the inner surface of the pipe wall, a series of vanes secured to the concave side of the pan in oblique arrangement whereby gas passing through the said pipe is given a spiral motion when the pan and vanes are placed therein, and means attached to the pan for separating it from the wall of the pipe.

4. The combination of a cylindrical gas-conducting pipe open at both ends and having a substantially uniform diameter, and a series of vanes located at one side of the pipe which is otherwise substantially unobstructed and which is imperforate at points immediately adjacent the vanes, the said vanes being all similarly arranged in oblique positions whereby gas passing through the pipe is given a spiral motion serving to deposit entrained liquid on the pipe walls and on the vanes.

5. The combination of a substantially horizontal gas-conducting pipe open at both ends and having a substantially uniform diameter, a series of vanes located at the lower side of the pipe which is otherwise substantially unobstructed and which is imperforate at points immediately adjacent the vanes, the said vanes being all similarly arranged in oblique positions whereby gas passing through the pipe is given a spiral motion, and means for draining from the pipe any liquid deposited therein.

6. The combination of a cylindrical gas-conducting pipe having a substantially uniform diameter, a series of vanes, and unitary means detachable from the pipe and engaging the said vanes to hold them in oblique positions at one side of the pipe which is otherwise substantially unobstructed, the said vanes causing gas passing through the pipe to have a spiral motion serving to deposit entrained liquid on the pipe walls and on the vanes.

7. The combination of a gas-conducting pipe having a substantially uniform diameter, a pan at one side of the pipe curved to approximately conform to the inner surface of the pipe wall, and a series of vanes secured to the concave side of the pan in oblique arrangement, whereby gas passing through the pipe is given a spiral motion serving to deposit entrained liquid on the pipe walls, on the vanes and on the pan.

8. The combination of a gas-conducting pipe having a substantially uniform diameter, a pan at one side of the pipe curved to approximately conform to the inner surface of a pipe wall, and a series of vanes secured to the concave side of the pan with a liquid-flow space between each vane and the pan, the said vanes being in oblique arrangement, whereby gas passing through the pipe is given a spiral motion serving to deposit entrained liquid in the pipe walls, on the vanes and on the pan.

9. The combination of a gas-conducting pipe having a substantially uniform diameter, a pan at one side of the pipe curved to approximately conform to the inner surface of the pipe wall, a series of vanes secured to the concave side of the pan in oblique arrangement, whereby gas passing through the pipe is given a spiral motion serving to deposit entrained liquid on the pipe walls, on the vanes and on the pan, and means for separating the pan from the wall of the pipe, whereby the deposited liquid is protected from the action of the gas.

10. The combination of a gas-conducting pipe, means for giving an initial spiral motion to gas passing through the pipe, and a series of vanes located beyond the said means at one side of the pipe which is otherwise substantially unobstructed, the said vanes being all similarly arranged in oblique positions whereby the spiral motion of the gas is continued and accentuated.

11. The combination of a gas main divided into two separated alining parts, a separator pipe parallel with the main but out of alinement therewith, connections between the ends of the separator pipe and the respectively adjacent ends of the parts of the main, means in the separator pipe for separating liquid from the gas passing therethrough, and a reservoir for liquid connected with the separator pipe and located in alinement with the said parts of the main.

12. The combination of a gas main divided into two separated alining parts which are mechanically independent and each of which is closed at its end independently of the other, a separator pipe parallel with the main but out of alinement therewith, connections between the ends of the separator pipe and the adjacent ends of the parts of the main, means in the separator pipe for separating liquid from the gas passing therethrough, and means interposed between the two closed ends of the main for holding the said parts separated.

13. The combination of a gas main divided into two separated alining parts, a separator pipe parallel with the main but out of alinement therewith, connections between the ends of the separator pipe and the adjacent ends of the parts of the main, means in the separator pipe for separating liquid from the gas passing therethrough, a reservoir for liquid connected with the separator pipe and located in alinement with the said parts of the main, and means interposed between the reservoir and the two parts of the main for holding the said parts separated.

14. The combination of a gas main divided into two separated alining parts, a separator pipe parallel with the main but out of alinement therewith, connections between the ends of the separator pipe and the adjacent ends of the parts of the main, means in the separator pipe for separating liquid from the gas passing therethrough, a reservoir pipe below and parallel with the separator pipe closed at its ends and provided with a drainage means, and connections for leading liquid from the separator pipe to the reservoir pipe.

In testimony whereof, I affix my signature.

JAS. P. FISHER.

Copies of this patent may be obtained for five cents each, by addressing the "Commissioner of Patents, Washington, D. C."